TRANSISTOR CIRCUITS

Filed Sept. 18, 1953

INVENTOR
REINALD S. NIELSEN
BY Paul S Martin
ATTORNEY

United States Patent Office 2,809,239

Patented Oct. 8, 1957

2,809,239

TRANSISTOR CIRCUITS

Reinald S. Nielsen, Deerfield, Ill., assignor to Sylvania Electric Products Inc., a corporation of Massachusetts Application September 18, 1953, Serial No. 381,078

2 Claims. (Cl. 179—171)

The present invention relates to semiconductor signal-translating devices, and in particular to improved means for performing a variety of electrical functions with transistors, such as amplifying, generating, modulating, and heterodyning or converting electrical signals. The invention is especially intended for so-called "small-signal" reproducing circuits, in contrast to so-called "switching" circuits in which changes in output are initiated by input pulses but are not otherwise related to the input, in the sense of wave-form reproduction.

Transistors have obtained a wide scope of application in small-signal reproducing circuits for example as that in the article "A crystal mixer", by Rowland Haegele, published in the Sylvania Technologist (published by Sylvania Electric Products Inc.) July 1949 at pages 2 to 4. A typical transistor circuit for this type of application includes a body of semiconductive material, such as of N-type germanium, having a low-resistance ohmic connection or base electrode, and a pair of rectifying barriers, referred to respectively as emitter and collector electrodes or terminals. A small bias of one sign is applied between the emitter and base electrode, and a larger bias of the opposite sign is applied between the collector and base electrodes. As is well understood, for a body of N-type material, the emitter electrode is biased positive with respect to the base and the collector electrode is biased negative with respect to the base; conversely with the body of P-type material, the signs are reversed. With both P-type and N-type materials the emitter is biased in the forward-conducting direction and the collector electrode is biased in the back-conducting direction. In respect to biasing potentials, these circuits may be characterized as having biases of opposite signs respectively applied to the emitter and collector electrodes.

In designing signal-reproducing circuits, the circuit determinant derived from the well-known equivalent circuit may be used to define the relationship of transistor internal parameters to external circuit parameters. For example, for the grounded base point-contact transistor, the circuit determinant is as follows:

$$(1) \qquad \Delta=(r_{11}+R_g)(r_{22}+R_c)-r_{12}r_{21}$$

where $R_g$ and $R_c$ are the total resistances in the external circuits of the emitter and collector respectively, and the lower case $r$'s are the internal transistor parameters having the dimensions of resistance as defined by W. Shockley in his "Electrons and Holes in Semiconductors", D. Van Nostrand Co., New York, N. Y. (1950), pages 37–46. The determinant should be positive to realize desired transistor characteristics.

The present invention relates to simplified and improved so-called "small-signal" reproducing circuits utilizing transistors in which the electrodes are biased in the manner causing minimum static current flow in the output circuit; and both the emitter and collector terminals or electrodes are biased in the same sense, in the reverse-conducting polarity in terms of rectifier performance. Thus the electrodes are biased voltage negative in respect to the base electrode for N-type point-contact transistors and P-N-P type junction transistors, and voltage positive in respect to the base electrode for P-type point contact transistors and N-P-N junction transistors. For effective transistor functioning, the impedance values in the transistor and the input and output circuits are related to provide a positive determinant when the emitter terminal or electrode is driven instantaneously forward conducting by an input signal, either externally obtained or through feed back, as will become apparent from the several illustrative applications detailed below.

In accordance with one aspect of the present invention a power amplifier may be provided employing a transistor of the aforesaid character and having a tuned load which may be excited to sustain continuous oscillation, analogous in many respects to a conventional class C vacuum tube amplifier. Following the outline concepts of the invention, the emitter bias is of the same sign as the collector bias and in the illustrative embodiment detailed below is derived from the input signal through the rectification properties of the transistor emitter-base circuit. The input signal, which is superposed upon the emitter bias is of sufficient amplitude to drive the emitter into forward conduction in the sense of rectifier performance during a relatively short period of the cycle, driving the emitter electrode or terminal instantaneously forward conducting. This results in heavy current flow in the high impedance resonant output or tuned load of the collector circuit and sustained oscillations at a power level which is comparably higher than the input power level, thus resulting in power amplification.

This is not truly a transistor analogue of the well-known class C vacuum tube circuit. According to the "duality" principle for comparing vacuum tube and transistor circuits, voltages in one type of circuit are translated as currents in the other, positive reactances as negative, etc. Now, if a class C amplifier of the vacuum tube type is considered, it is evident that an output-current-suppressing or negative voltage is normally impressed on the input electrode, so that in the transistor analogue there should be a sustained forward emitter current, as by application of forward-conducting bias. This carries with it sustained maximum output current, which is properly related in the duality concept, to maximum anode voltage during intervals between signal pulses. Such a class C transistor circuit is obviously of poor efficiency, and is not of concern in the present disclosure.

As a specific feature an amplifier may be constructed in which the output resonant load or tank circuit may be resonated at frequencies which are integral multiples of the input signal frequency, thus achieving frequency multiplication.

In accordance with a further aspect of the invention, a radio frequency oscillator may be provided which relies upon excitation of a resonant circuit to sustain continuous oscillations. The resonant circuit may be arranged to provide a power feed back path between the input and output circuits and an impedance matching device. The emitter bias is of the same sign as the collector bias, and, in this illustrative oscillator detailed below, is advantageously derived from the rectification of the oscillator feed-back signal in the emitter-base transistor circuit. The resonant circuit is tuned to the operating frequency and when D. C. power is applied in the collector circuit, the resonant circuit will oscillate. Since the time phase of the feed back signal to the emitter is identical to the signal on the collector electrode, regenerative feed back is obtained and oscillations are self-sustaining at the frequency of the resonant circuit. In this instance, the tank circuit serves as an impedance changing and matching device between the collector and emitter electrodes to better oscillation stability and wave form.

In accordance with a still further aspect of the present invention, a transistor regenerative detector circuit functioning in a manner similar to a vacuum tube regenerative detector may be provided and once again back-conducting biases are applied to the emitter and collector electrodes. An external regenerative feed back path is provided between the collector and emitter electrodes. An appropriate control is provided in the regenerative feed back path for obtaining maximum regeneration without causing oscillation to establish the circuit at the verge of oscillation. Upon introduction of an appropriate amplitude modulated signal, the D. C. collector current will vary at the modulation rate and the desired detecting function is achieved.

In all of these reverse-conducting-biased signal reproducing circuits, the various parameters are related to provide a positive determinant. This contrasts with switching circuits which often utilize like reverse-conducting bias at emitter and collector but which are unstable, or bistable, and are characterized by negative determinants.

The invention and its further features of novelty will be best understood in the following detailed descriptions of its principles, several illustrative embodiments being represented in the annexed drawings and forming part of this disclosure.

Figure 1:
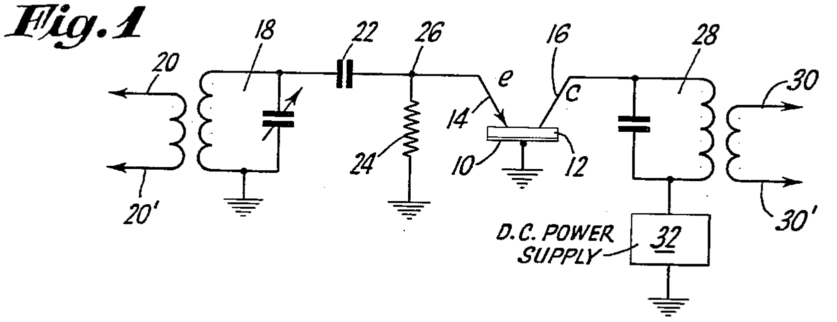
Fig. 1 is a diagrammatic circuit of a transistor power amplifier embodying features of the present invention.

Although the several illustrative circuits of the present invention specifically employ a point-contact type of transistor, and these circuits employ the base as a grounded or common input and output circuit connection, it is to be expressly understood that the invention has application to other types, including junction transistors and to other electrode configurations. The point-contact transistor illustrated is of well-known construction and utilizes a rectifying input or emitter connection or electrode spaced from a rectifying output or collector connection or electrode by a small distance, as .002 inch in the case of the point-contact transistor. Such devices, apart from the illustrated circuits are known, and may include for example, a body of N-type semiconductive germanium having a low-resistance ohmic connection as the base, a Phosphor bronze sharp-ended wire engaging a conventionally etched surface of the germanium so as to be a good hole emitter together with a sharp-ended wire collector electrically treated to impart low leakage, high rectification ratio characteristics. In Fig. 1, there is illustrated a grounded base power amplifier having a low impedance input and a high impedance output. The power amplifier employs a transistor of the type described above, including a base 10 on an N-type body of germanium 12, engaged by emitter and collector electrodes 14, 16 respectively. The base resistance should be low, since backward transmission depends upon this property; although not illustrated, a direct current supply and a base resistor may be connected in series between the base electrode 10 and ground. An appropriate signal input circuit such as the resonant tank 18 is provided for effectively coupling the relatively small signal derived from a source (not shown) at appropriate terminals 20, 20' to the emitter electrode 14, the input signal being applied via condenser 22 that is part of the emitter bias supply. This supply further includes a shunting resistor across the tank 18 and condenser 22. The bias circuit includes the condenser and the resistor in series across the signal input source. Common terminal 26 of the biasing resistor and condenser is connected to the emitter electrode. The collector electrode 16 is connected through a resonant load 28 to a D. C. power supply 32, an appropriate inductive take-off or the like being provided for coupling power to the output terminals, 30, 30'. In the illustrative construction employing an N-type point-contact transistor, the emitter voltage is negative in respect to the base, the bias being derived from rectification of the amplifier input signal in the emitter-base circuit of the transistor. The rectifying voltage appears across the condenser 22 and by appropriate selection of the condenser and resistor parameters, can be made to correspond to the proper value for the bias voltage which, in a well known manner, serves to eliminate short circuit instability inherent to the transistor. The circuit parameters are related in the well known formula derived from the equivalent circuit to provide a positive determinant when the emitter electrode is rendered instantaneously forward conducting by the input signals impressed on the emitter electrode. The determinant for the grounded base connection is given above.

In normal operation of the illustrated amplifier circuit, the resonant input or tank circuit 18 is tuned to the frequency of the input signal. The input signal, which is superposed upon the emitter bias periodically, attains an amplitude sufficient to cause the emitter current to be positive for a relatively short interval of the cycle. During this period, when the emitter is driven voltage positive in respect to the base, emitter current flows between the emitter and base, causing collector current flow between the collector and base. The collector current is drawn through the output tuned load or tank 28 and when this tank is tuned to the input frequency, sustained oscillation occurs at a power level appreciably higher than that existing in the input tank circuit 18. Thus, more power is available from the output tank circuit than is supplied in the input tank circuit and power amplification results, the output power being derived at the inductive take-off to the terminals 30, 30'.

In lieu of making the output tank circuit resonant at the input frequency, the output tank circuit may be resonated at frequencies which are integral multiples of the input frequency, thus resulting in frequency multiplication.

Manifest advantages are derived from the circuit including avoidance of short-circuit instability, use of voltage supplies rather than current supplies as the D. C. power source 32, the facility to shunt or series feed of the bias, and relative insensitivity of the circuit to large changes in transistor signal and power supplies.

Figure 2:
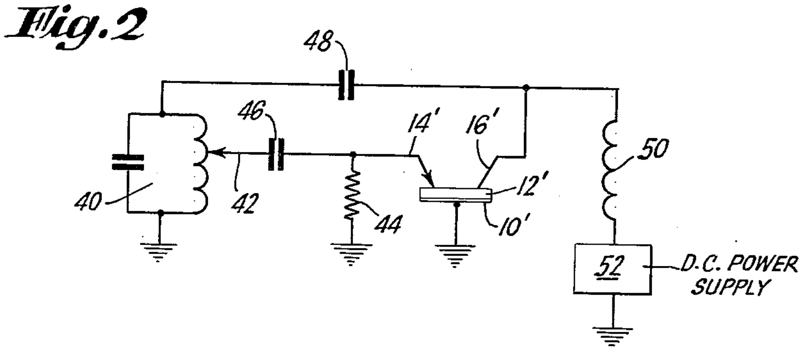
Fig. 2 is a diagrammatic circuit of a transistor oscillator embodying features of the present invention.

Reference will now be made to Fig. 2, wherein there is disclosed a radio frequency oscillator having circuit parameters selected to provide a positive determinant and relying upon a positive external feed back path, unlike known transistor oscillators which depend upon the negative resistance characteristic of the transistor for sustaining oscillations. Specifically, a frequency-determining circuit 40 is connected to the emitter electrode 14' of the transistor unit having the grounded base 10', the semiconductor body 12' and the collector electrode 16'. The frequency-determining or input tank circuit is coupled by the variable tap 42 through a self-biasing network including a grounded shunt resistor 44 and a series condenser 46. The input tank circuit is relied upon to sustain continuous oscillation and is connected to the oscillator output circuit, namely to the collector electrode via a feed back path including a coupling condenser 48. The collector circuit includes a radio frequency choke coil 50 in circuit with a D. C. power supply 52.

Bias for the emitter electrode is derived from rectification of the oscillator feed back signal, the rectified voltage appearing across the condenser 46. Once again appropriate choice of the values of the resistor 44 and the condenser 46 facilitates obtaining the proper value of the emitter biasing voltage which is effective to eliminate short circuit instability inherent in the transistor. As previously pointed out for an N-type semiconductor body 12′, the bias voltage on the emitter electrode is negative in respect to the base and corresponds in sign to the sign of the collector bias relative to the base.

In operation of the oscillator, when D. C. power is applied in the collector circuit, the positive feed back path between the collector electrode 16′ and the emitter electrode 14′ causes the input tank circuit 40 to resonate at the operating frequency. As is well understood for transistor circuits, the time phase of the signal at the emitter is identical to the time phase of the signal at the collector. The feed back is regenerative, oscillations being self-sustained at the frequency of resonance of the tank circuit 40.

Among the advantages derived from the oscillator circuit of Fig. 2 are overcoming short circuit instability, facility to impedance matching and changing through the tank circuit 40, and the ability to use a variety of frequency-determining circuits, such as quartz crystals.

Figure 3:
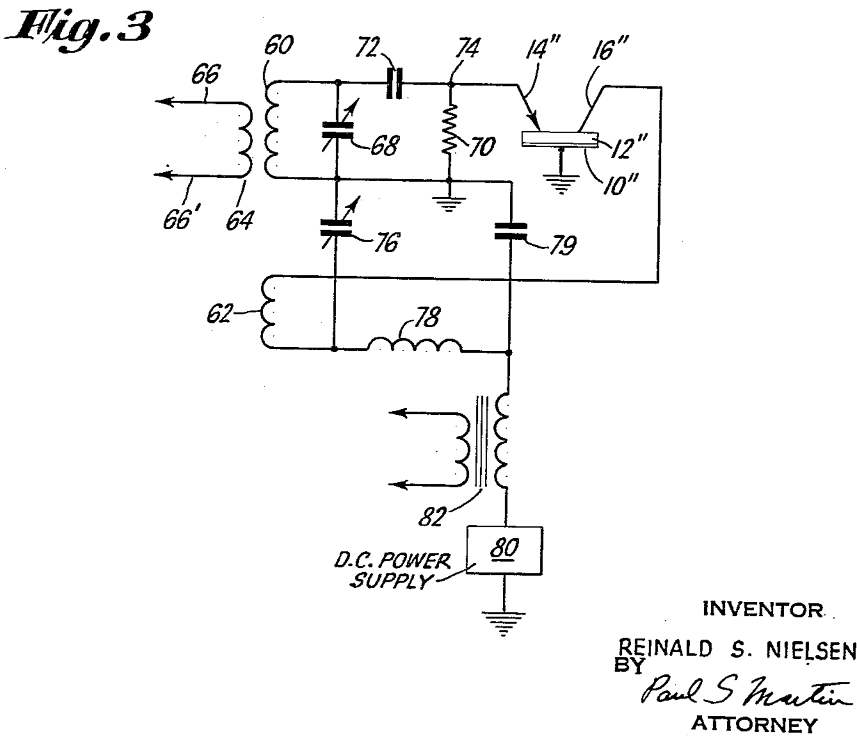
Fig. 3 is a diagrammatic circuit of a transistor regenerative detector embodying features of the present invention.

Reference will now be made to Fig. 3 wherein there is disclosed a radio frequency signal regenerative detector embodying further features of the present invention and employing a point contact transistor of the type including a base electrode 10″, an N-type body of germanium 12″, an emitter electrode 14″ and a collector electrode 16″. Once again the circuit employs the concept of having the emitter and collector electrodes biased in the same sense, namely negative for an N-type point-contact transistor, with a positive circuit determinant when instantaneous forward-conducting potential is applied to the emitter electrode. The transistor regenerative detector, which functions in a manner similar to a vacuum tube regenerative detector, includes coils 62, 64 inductively coupled together with the coil 64 having terminals 66, 66′ for connection to a modulated radio frequency input. A tank circuit is provided by a tunable condenser 68 connected across the coil 60, the input circuit being coupled to the emitter electrode 14″ via a biasing network including the grounded resistance 70 and the series condenser 72 having a common terminal connection 74 to the emitter electrode. The collector circuit includes the coil 62 which is effective to couple a feed back signal into the tuned input of the coil and condenser 60, 68. An appropriate regeneration control condenser 76 is connected to one side of the input tank from one terminal of a radio frequency choke 78, the other terminal of which is grounded over a radio frequency by pass condenser 79. The D. C. power source 80 is connected in the collector circuit, an appropriate coupling transformer 82 being arranged in circuit therewith for the modulation signal output.

In operation, the coils 60, 62 are inductively coupled in a manner to cause positive feed back from the collector circuit to the emitter circuit. When the regeneration control condenser 76 is adjusted near maximum capacity, the coil 62 is sufficiently bypassed to effectively couple the feed back signal into the coil 60 of the input tank circuit, and the circuit then functions as a simple oscillator. As an oscillator of a form somewhat different from that illustrated in Fig. 2, the emitter bias is once again obtained by rectification of the feed back signal at the emitter, coils 60, 62 providing the necessary impedance transformation to sustain oscillations. By backing regeneration control condenser 76 from a maximum capacity position, the illustrated circuit will sit on the verge of oscillation and upon introduction of an amplitude modulated signal at the input terminals 66, 66′ of the input coil 64, the D. C. collector current will vary at the modulation rate. The coupling or output transformer 82 makes the D. C. current variations available as an alternating signal at the modulated frequency.

In accordance with this aspect of the invention, increase of feed back will cause the circuit to "squeg" in a well-known manner, and operate as a super-regenerative detector. The "squegging" frequency will be readily determined by the feed back impedances and the values of the resistance 70 and condenser 72 making up the emitter biasing network.

Among the advantages of the circuit illustrated in Fig. 3 are large amplification of the modulated signal, great sensitivity to radio frequency signals or high conversion gain as compared to the normal diode detector, the need for only a single power supply having a relatively low impedance, ability to detect both continuous wave radio frequency signals when in oscillating condition or amplitude modulated signals in the non-oscillating condition, and the faciilty for super-regenerative operation for the detection of frequency modulated signals.

Upon consideration of the several foregoing illustrative embodiments, it will be appreciated that there has been provided a semiconductor circuit which includes a transistor having a semiconductor body with base, emitter and collector electrodes with an input circuit for applying signals for the emitter electrode and an output circuit connected to the collector electrode and effective to produce an output signal related in both magnitude and duration to the input signal. In all embodiments of the invention, suitable means are provided for applying back conducting biases to both the control electrode and the collector electrode, the means for providing the bias to the emitter electrode advantageously taking the form of a self-biasing network that is outside the current flow path of the collector electrode. With the impedance values in the transistor and the input and output circuits related to provide a positive determinant, the several desired functions may be achieved by the respective circuits when the emitter electrode is driven instantaneously forward conducting by an input derived either from an external signal source or from a feed back path coupled to the ocllector circuit.

What is claimed is:

1. A small-signal reproducing circuit including a transistor having a semiconductive body, base, emitter and collector electrodes for said semiconductive body, an input circuit connected to said emitter electrode and said base electrode and an output circuit connected to said collector electrode and said base electrode, means for providing back-conducting biases to said emitter and collector electrodes in relation to said base electrode, the means for providing back-conducting bias to said emitter electrode including a self-biasing network in said input circuit, said self-biasing network having a shunt resistor connected to said base electrode and a series connected condenser, the emitter electrode being directly connected to said resistor and to said condenser, said biasing network being arranged relative to said output circuit to be out of the collector current path, and means effective in said input circuit for driving said emitter electrode instantaneously forward conducting, the impedance values in said transistor and said input and output circuits being related to provide a positive circuit determinant when said emitter electrode is forward conducting.

2. A power amplifier comprising a transistor including a semiconductor body having base, emitter, and collector electrodes, an input circuit including a resonant circuit for applying a small-signal input signal to the emitter electrode of said transistor, a biasing network having a condenser and a resistor connected in series across said resonant circuit, the emitter electrode being directly connected to the common connection of said condenser and resistor, said biasing network being effective with the emitter-base circuit of said transistor to apply back-conducting bias to said emitter electrode, a resonant output circuit for providing an output signal related in magnitude and duration to said input circuit, means for providing back-conducting bias to said emitter and collector electrodes in relation to said base electrode, and means effective to impress input signals to said transistor for driving said emitter electrode forward conducting, the impedances of said input and output circuits being related to each other and to the transistor parameters to provide a positive determinant when said emitter electrode is instantaneously forward conducting.

References Cited in the file of this patent

UNITED STATES PATENTS

| | | |
|---|---|---|
| 2,486,776 | Barney | Nov. 1, 1949 |
| 2,644,859 | Barton | July 7, 1953 |
| 2,644,914 | Kircher | July 7, 1953 |
| 2,644,925 | Koros | July 7, 1953 |
| 2,652,460 | Wallace | Sept. 15, 1953 |

OTHER REFERENCES

The Radio Amateur's Handbook, pages 73, 74 (note Fig. 323); 80 (note Fig. 335); pages 146, 147 (note Fig. 707), 23rd Edition (1946).

Raisbeck: Transistor Circuit Design, pages 128–134, Electronics, December 1951.

Bell text: "The Transistor," pages 105–107, 143–144, 355, 356, 373, 401, 402 and 409, pub. 1951 by Bell Tel. Labs., Murray Hill, N. J.